(12) United States Patent
Nobumoto

(10) Patent No.: US 6,437,229 B1
(45) Date of Patent: Aug. 20, 2002

(54) EQUIPMENT AND PROCESS FOR MUSIC DIGITALIZATION STORAGE, ACCESS, AND LISTENING

(75) Inventor: Fernando H. Nobumoto, São Paulo (BR)

(73) Assignee: Itautec Phico S/A, Sao Paulo (BR)

( * ) Notice: Subject to any disclaimer, the term of this patent is extended or adjusted under 35 U.S.C. 154(b) by 0 days.

(21) Appl. No.: 09/715,854

(22) Filed: Nov. 17, 2000

(51) Int. Cl.$^7$ ................................................. G01H 1/18
(52) U.S. Cl. .............................. 84/615; 84/600; 84/601; 84/603; 84/617
(58) Field of Search .......................... 84/600–603, 615, 84/618, 653, 656, DIG. 2, 617; 434/307 A

(56) References Cited

U.S. PATENT DOCUMENTS

| | | | |
|---|---|---|---|
| 5,691,494 A | * 11/1997 | Sai et al. ................ | 434/307 A |
| 5,728,960 A | *  3/1998 | Sitrick ..................... | 84/477 R |
| 5,819,049 A | 10/1998 | Rietmann | |
| 5,824,934 A | * 10/1998 | Tsurumi et al. ......... | 434/307 A |
| 5,899,699 A | *  5/1999 | Kamiya ................... | 434/307 A |
| 6,084,168 A | *  7/2000 | Sitrick ..................... | 84/477 R |
| 6,201,176 B1 | *  3/2001 | Yourlo .................... | 84/615 |
| 6,324,378 B1 | * 11/2001 | Schlossberg ........... | 434/307 R |
| 6,346,951 B1 | 2/2002 | Mastronardi | |

FOREIGN PATENT DOCUMENTS

| | | |
|---|---|---|
| EP | 0 535 921 A2 | 4/1993 |
| EP | 0 953 979 A2 | 11/1999 |

* cited by examiner

*Primary Examiner*—Marlon T. Fletcher
(74) *Attorney, Agent, or Firm*—Kattem Muchin Zavis Rosenman

(57) ABSTRACT

A digital music server, a music digitizing station, and at least one listening stations connected in a network. Each listening station includes an earphone, keyboard, display, and bar code reader. The bar code on a compact disk (CD) is scanned using the bar code reader at a listening station, and stored containing tracks from the selected CD are quickly accessed. By using the display and keyboard, the desired track is selected, and the sound volume is controlled. As the selected song file is downloaded from the server to the listening station. The listening station plays the selected track by means of an audio adapter through the earphone of said listening station.

15 Claims, 3 Drawing Sheets

EQUIPMENT AND PROCESS FOR MUSIC DIGITALIZATION STORAGE, ACCESS, AND LISTENING

BACKGROUND

The present invention relates generally to and, more particularly, to generally to digitizing, storing, and retrieving digitized information and, more particularly, to equipment and a process for digitizing, storing, accessing, and listening to music in a commercial establishment which sells compact discs (CD) so that customers may listen to all the songs from all the CDs available in the shop.

As it is known in the art, in some shops that sell CDs, usually one or more CD payers are provided, which when requested by the customer, enable the customer to listen or preview a certain song from a CD before buying it. Obviously, not many CDs are available for preview. The shop employees or owner makes the most requested or sold CD available for preview. Only these CDs are available for preview on shop CD players, regardless of whether the customer buys the product. Further, because only a limited number of CD players are available for listening, the customers do not always have a chance to preview their desired songs. Some consumers choose not to wait and eventually may choose not to purchase the CD.

In larger shops, the traditional system that allows the users to listen to the songs from a certain CD consists of CD players arranged throughout the shop. Large shops may offer either listening stations, with separate CD players, or a totem pole or kiosk arrangement, with groups of CD players ranging from one to five or more. Usually, each CD player already has a CD inserted. The employees shop owner often selects the CD considered to be one of the most interesting or requested. In the totem pole or kiosk arrangement, a central controller enables a consumer to select the desired CD for preview from the CDs inserted in the CD players in the totem pole or kiosk. Of course, the consumer may choose the track from the desired CD and increase/decrease the volume. Because these conventional systems use CD players, the inherently limit the number of CDs to which the customer may listen. Considering a medium size shop having ten totem poles or kiosks, each having five CD players, only a total of 50 CDs are available for listening. This is a small percentage of the thousands of other CDs which the shop may offer.

More recently, systems have developed, which use personal computers (PC) in the listening stations. The PC stores music and are networked so that a server can look to other PCs in the network when a selected song is not stored in the computer at the listening station. The selected song may be found and copied or moved from the server to the requesting PC at the listening station. One disadvantage of these systems is that the computers used in the several listening stations must be configured to enable the storage of songs, making the cost of the system rather expensive. In addition, even properly configured computers are often very slow, causing delays while downloading large amounts of data through the local network.

It is an object of the present invention to make the present systems less expensive and faster, while enabling the access and preview of songs, and to allow consumers to listen to almost all the CDs available in the shops.

In general, the present invention includes a digitized music server, such as a PC, where music or other information from the digitized CDs will be stored, a music digitalization station, such as a PC, for the digitizing a portion of each track from each song from each CD and several listening stations, such as PCs through which the digitized and stored music in the server may be accessed and previewed by the users. Each listening station includes an earphone, a keyboard with a display, a bar code reader, and communicates with the server via a local network. Each CD includes a label with a barcode which specifically identifies each CD.

When the user desires to listen to a particular track from a particular CD, the user scans the CD by using the bar code reader of a listening station, so that the music files from the selected CD are quickly located. Using the keyboard and the display, the user may then select the desired track for review. The user may control the listening station through the network. By means of an audio adapter, the computer plays the selected track through the earphone of the listening station.

Unlike conventional systems, the selected track file does not need to be stored at the PC prior to preview. According to the present invention, the selected track file is downloaded only to the listening station PC and the user listens to the track through the earphone while that downloading occurs.

The present invention yields several advantages. By playing tracks on the fly, without the need of storage in the listening stations computers, the present invention utilizes substantially simpler computers in the listening stations, including even the least expensive and simple computers. Consequently, the equipment and process cost is substantially reduced verses conventional systems. In addition, delays due to downloading large amounts of data through the local network are significantly reduced. Optionally, and depending on the particular application, one computer may service more than one listening station, further reducing the overall costs.

The present invention thus offers the consumer the option of listening to all the tracks from all the CDs available in the shop in a substantially simpler, faster, and less expensive solution than existing systems.

For a more complete understanding of the invention, its objects and advantages, reference should be made to the following specification and to the accompanying drawings.

SUMMARY OF THE INVENTION

The present invention is directed to a digital music storage and reproduction apparatus including a digital music server and a digital music station. The music storage apparatus at least one listening station also includes a network for interconnecting the music station.

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views.

DETAILED DESCRIPTION OF THE INVENTION

Figure 1:
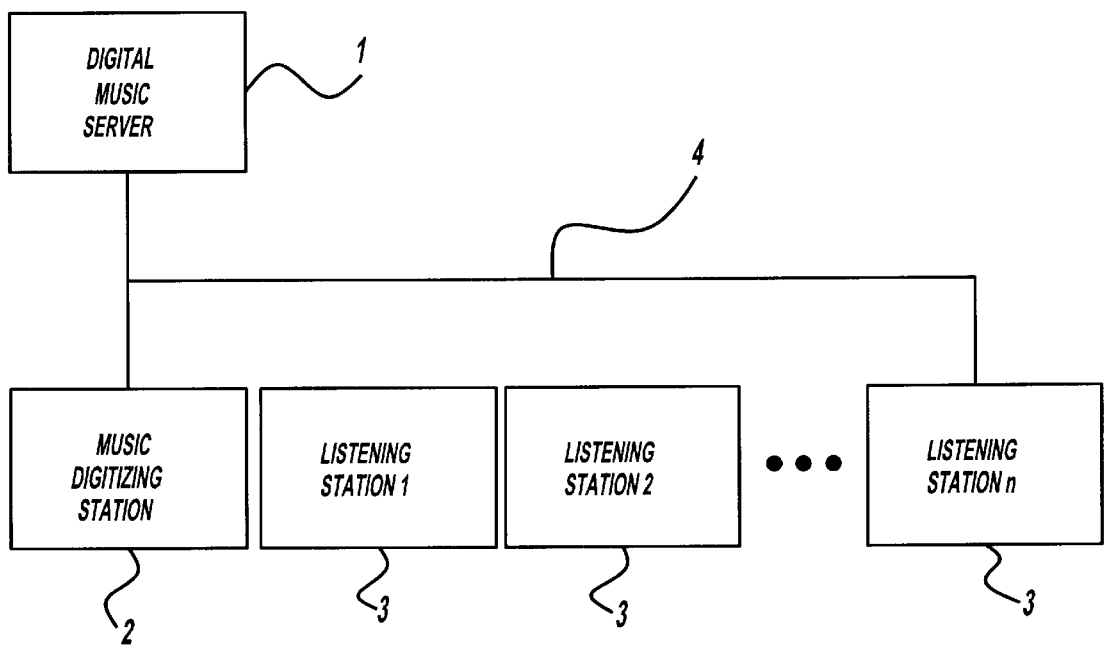
FIG. 1 is a is a block diagram of the system for digitizing, storing, accessing, and listening arranged in accordance with the present invention.

According to schematic illustration of the block diagram of FIG. 1, the music review system 10 of the subject invention includes a digital music server 1, a music digitizing station 2, and listening stations 3 interconnected to the server 1 and the station 2 by local network 4. The number and location of listening station 3 may vary and are preferably selected to maximize convenient use of the system. The digital music server 1 is preferably embodied as a personal computer (PC) with a large capacity hard disk intended for storing the digitized music centralized, in a database, including all the digital information from the compact discs (CDs). Note that in addition to CD's TM subject invention is applicable to music and/or video stored in a digital format.

The digitizing station 2 is preferably embodied as a PC having a CD-ROM reader and an optional bar code reader. Digitizing station 2 digitizes a passage, preferably the first thirty seconds, of each track from an audio CD, converting it into a MPEG-1, layer 3 (MPEG) format, and storing it in the digital music server 1. Digitizing station 2 includes software which enables control and music digitization. For a digitized audio CD, a data record having the information from the CD is entered in the database of music server 1. Optionally, if several CDs are to be digitized, more than one digitizing station 2 may be used.

In addition, digitizing station 2 includes maintenance software which excludes CDs or MP3 files of previously digitized music. The maintenance software also updates data concerning the CDs in the database and digitized CD listing and generates a summary of the changes made during a predetermined time period, so that similar systems at other locations may be correspondingly updated. Similarly, the maintenance software enables updating the local system based upon changes that have been made in systems at other locations. The maintenance software also enables listing access statistics of the listening stations, both individually and collectively to determine which CDs were accessed the most during a predetermined time period.

Each listening station 3 is preferably embodied as a relatively simple PC configuration, including an audio adapter, a bar code reader, a keyboard or similar input device, a message display device, and an earphone. Each listening station allows a user to access and listen to the stored music. Each station preferably includes software that decompresses the stored music and plays the decompressed music in the earphone through the audio adapter. The user is preferably limited to accessing the bar code reader, the keyboard, the display, and the earphone. Communication with the bar code reader and with the keyboard preferably occurs through conventional serial ports, such as RS232C, RS485, USB or keyboard interface, and the sound is output to the earphone through the audio adapter. The earphones can be of the conventional type usually found in the market, but their cable must be protected or shielded, such as by a steel spiral, in order to avoid losses. Thus, the earphone cable is preferably shielded to limit losses. The bar code reader may be embodied a laser scanner, with line scanning, or a charge coupled device (CCD) technology scanner. The keyboard may be embodied as a simple keyboard, with enough keys to allow the user to type only the track number, control the sound volume, and switch to the next or previous track. Local network 4 preferably operates at a bandwidth of approximately around 100 Megabytes (MB), even when considering the distance between listening stations 3 and the server 1. In cases of very long distances, additional equipment may be required to support the desired bandwidth.

Figure 2:
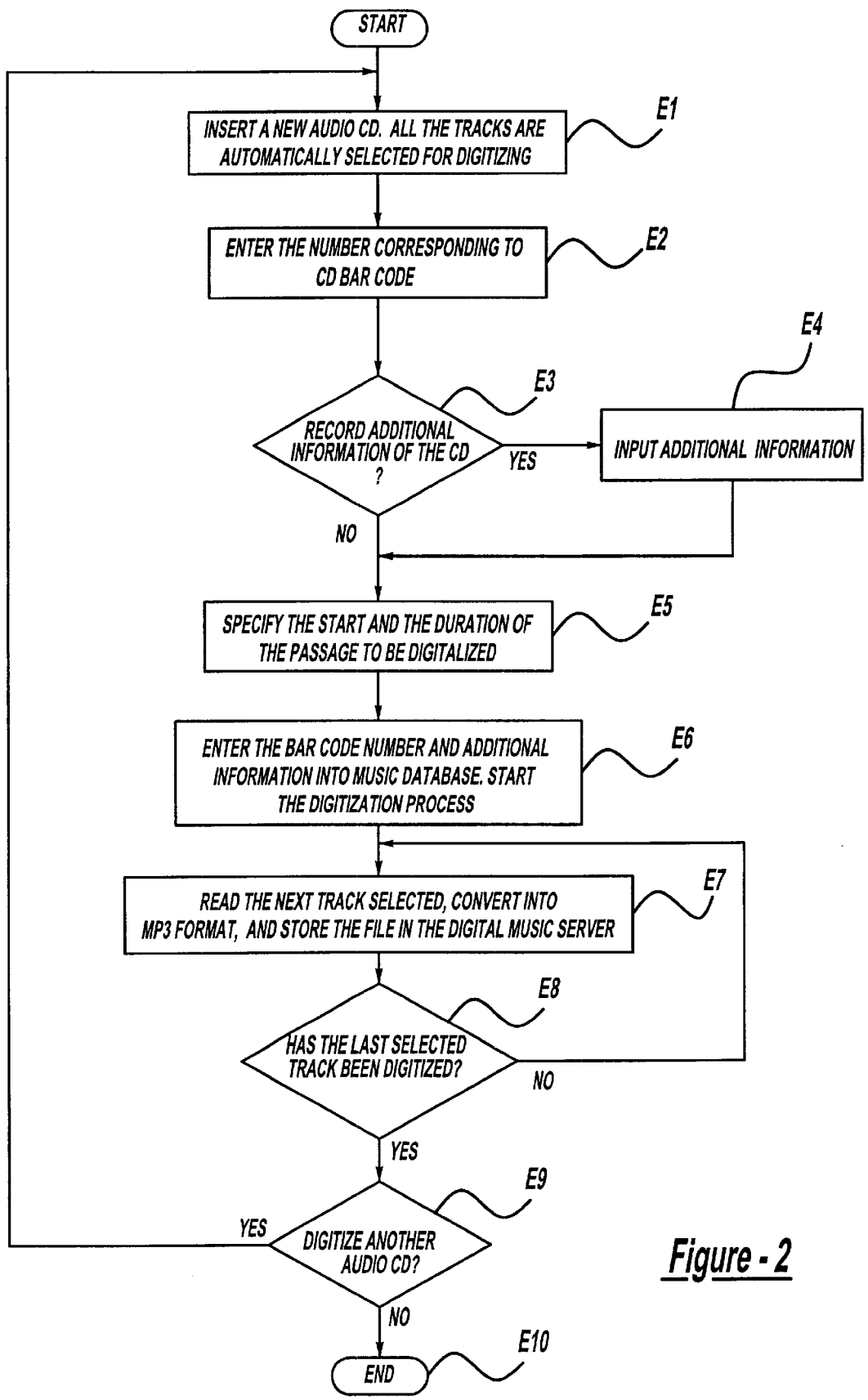
FIG. 2 is a flow chart detailing operation of the server.

FIG. 2 is a flow chart of the operation digital music server 1 showing the sequence of operations to carry out the digitization and storage of the music stored on the hard disk.

The process starts at step E1 by inserting an audio CD. At step E1 every track is automatically selected for digitization. In step E2, the operator enters a number corresponding to the CD bar code. In step E3, the operator indicates whether additional information about the CD will be input to the system. If so, the additional information for the CD is input in step E4.

Once the information is input to the system, or if no additional information is to be input, control proceeds to step E5, where the beginning and the duration of the music passage to be digitized is specified. In step E6, the CD bar code number and any additional information are entered into the music database of digital music server 1. The digitization of the tracks from the inserted CD is then started.

In step E7, the digital reading and storing of the first track selected is occurred by converting it into MP3 format and storing in digital music server 1. Preferably the digitized information is stored in a file named in accordance with the bar code number and track number.

In step E8, a determination is made whether the last track has been digitized. If not, control returns to step E7 which reads the next track selected, converts it into MP3 format, and stores the file in the digital music server. Step E7 is repeated for each track on the CD until all tracks have been digitized. Returning to step E8, if the last track has been digitized, control proceeds to step E9 which determines whether to digitize another audio CD. If yes, control proceeds to step E1. If not, the process terminates at block E10 digitization and storage of a passage from each track from the CD has been accomplished.

Figure 3:
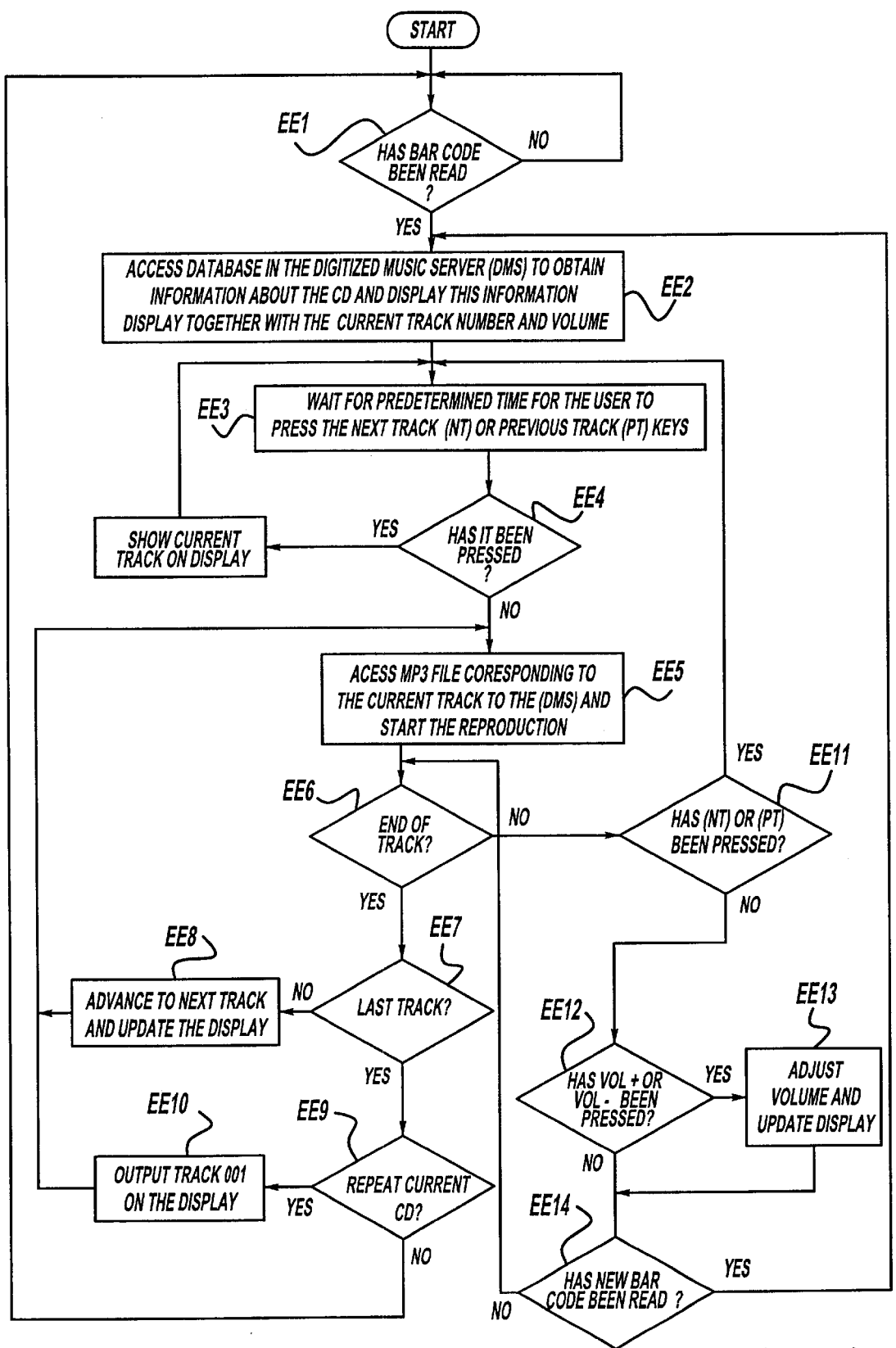
FIG. 3 is a flow chart detailing operation of the listening station.

FIG. 3 is a flow chart of the operation of a listening station 3, showing the sequence of operations for the user to access and listen to selected tracks.

The user picks off the shelf in the shop the CD with desired tracks to preview, puts on the earphone, and scans the CD case using the bar code reader, as shown in step EE1. If the bar code has not been scanned control returns to block EE1 until the CD case has been successfully scanned by the bar code reader. Once the bar code is read in step EE1, control proceeds to step EE2, where the digitized music server 1 database is accessed. Information on the CD from the database is obtained, and the number of the first track, track 1, and current sound volume appear on the listening station display.

In step EE3, a certain period of time is provided for the user to press control keys on the keyboard of the listening station. The control keys include next track and previous track keys, which relate to the selected track appearing on the display. If the user desires to listen to the current track shown on the display, the user does not press the keys of the keyboard. If the user desires to listen to the next track or tracks or to the previous track or tracks the user presses keys corresponding to Next Track (NT) or Previous Track (DT).

Once the predetermined period of time with the current track on the display has elapsed, control proceeds to step EE5, where the MP3 file corresponding to the current track is accessed through the digitized music server 1. This substantially simultaneously reproduces the selected track through the earphone for listening by the user.

The following steps EE6 to EE14 present several possibilities for the user: (1) access the next or previous track(s); (2) increase/decrease the volume by using the keys VOL+ and VOL−; (3) scan another CD case using the bar code reader; and (4) return to the previous steps, according to the expected outcome. During those steps, the listening station program automatically detects the end of the track during reproduction, and if the current track is not the last track from the CD, listening station 3 automatically starts reproducing the next track. If the current is the last track, the program determines whether to repeat play from the first track the first automatically. If not, the program concludes the CD reproduction and shows a message on the display, requesting the user to scan a new CD by using the bar code reader.

More particularly, block EE6 determines whether play has reached the end of the current track. If so, step EE7 determines whether the current track is the last track. If the current track is not the last track, control proceeds to step EE8 which advances to the next track and updates the display. From step EE8, control proceeds back to step EE5 which accesses the MP3 file corresponding to the current track in digital music server 1 and plays the track. Returning to step EE7, if the current track is the last track, control proceeds to block EE9 which determines whether the current CD should be repeated. If so, control proceeds to step EE10 which selects track 001 from the CD and outputs track 001 on the display. From block EE10, control proceeds back to block EE5 and proceeds as described above. Returning to step EE9, if the current CD will not be repeated, control proceeds to block EE1 and proceeds as described above.

Returning to EE6, if the current track is not completed, control proceeds to step EE11, which determines whether the next track NT or previous PT keys have been pressed. If so, control proceeds to EE3 and proceeds as described above. If neither the NT or PT keys have been pressed, control proceeds to EE12 which determines whether the VOL− or VOL+ have been pressed. If neither adjustment key has been pressed, control proceeds to block EE14 determines whether a new bar code has been read. If not, control returns to block EE6 and proceeds as described above. If so, control returns to block EE2 and proceeds as described above. Returning to block EE12, if either volume key has been pressed, control proceeds to block EE13 which adjusts the volume and updates the display in accordance with the keys which have compressed. Control then proceeds to block EE14 and continues as described above.

The present invention enables users to listen to any track off of any CDs available in the shop, in a substantially simpler, faster, and less expensive manner, once the selected tracks are downloaded to the listening station 3. The subject invention eliminates the need to store at the listening station, enabling implementation using substantially simpler computers, thereby reducing the overall cost of the system of the subject invention.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A digital music storage and reproduction apparatus comprising:
   a digital music server;
   a digital music station;
   at least one listening station; and
   a network for interconnecting the music station;
   wherein the digita music station further comprises a personal computer (PC) including a compact disk reader (CD-ROM) and bar code reader, and digitizes a predetermined passage of each track from a CD, thereby converting it into a MPEG-1, layer 3 (MP3) format file and storing the digitized music in a database in the digital music server, the computer further including software which controls digitizing the music, wherein for each digitized CD, a record is entered in the database with the information from the CD, the computer further including a maintenance software which (1) prevents entering duplicate versions of already digitized music, (2) updates data related to the CDs stored in the database (3) generating of a summary of the changes made during a predetermined period of time to enable (4) updating correspond systems in other locations, updating local digital music server utilizing changes that have been made at remote digital music servers, and accessing statistics for selected CDs over a predetermined period of time.

2. The apparatus of claim 1, wherein the passages from the track to be digitized are preferably the thirty first seconds of each track.

3. The apparatus of claim 1, wherein the bandwidth of the local network is approximately 100 Megabytes.

4. A digital music storage and reproduction apparatus comprising:
   a digital music server;
   a digital music station for digitizing passages of songs;
   at least one listening station; and
   a network for interconnecting the music station;
   wherein the listening station further comprises a personal computer (PC) including an audio adapter, a bar code reader for identifying packaging associated with said passages of songs, a keyboard device, a message display, and an earphone, to enable a user to access and listen to the digitized passages of songs, the listening station further including software which decompresses the digitized passages of songs and plays them in the earphone via the audio adapter where the PC communicates with the bar code reader and with the keyboard device through one of a serial ports FRS232C, serial port RS485, serial port USB and a keyboard interface.

5. The apparatus of claim 4 wherein the earphones have shielded cables.

6. The apparatus of claim 4 wherein the bar code reader is a laser scanner, utilizing one of line scanning and a CCD scanning technology.

7. The apparatus of claim 4 wherein the keyboard device includes key to enable the user to select a track number, control the sound volume, and change to the next and previous tracks.

8. A method for digitizing and storing digitally encoded music in a digital music server comprising the steps of:
   inserting an audio compact disc (CD) and automatically selecting all the tracks for digitization and storage;
   determining whether to store additional information about the CD in the database and if so, providing the additional information about the CD;
   specifying a start and a duration of song passage of each track to be digitized;
   entering in the digitized music server database a bar code number and, the additional information, and starting the digitalization process of each track from the CD;
   reading a first track selected, converting the selected first track into an MP3 format and storing the connected track in the digitize music server using a file having a name including the bar code number and the track number;
   determining the last track selected has been digitized and, returning to the step of reading after selecting the next track, the step of reading and determining being repeated for all the tracks from the CD until the last track is digitized; and determining whether another audio CD will be digitized and returning to the step of inserting if another CD is to be digitized.

9. The method of claim 8 further comprising the step of accessing and listening to stored music from a listening station comprising the steps of:

selecting the CD by to listen to;

scanning the selected CD using by scanning the bar code;

accessing the digitized music stored in database of the music server to obtain the information on the selected CD, and determining the current sound volume;

providing a predetermined time period for a user at the listening station to make track selections at a keyboard device which respect to a current track;

selecting at the keyboard device, one of a next track (NT) or previous track (PT), if desired by the user;

accessing the MP3 file corresponding to the selected track using the digital music server, and simultaneously playing of the track selected via the earphone;

continuously selecting from the following starting the reproduction of the previous or next track, increasing and decreasing the volume utilizing "Vol+" and "Vol−" keys on the keyboard device scanning new CD for digitization and storage using the bar code reader; and automatically playing one of a next track and a first track of the current CD determine whether a new CD has been read by using the bar code reader.

10. A digital music storage and reproduction apparatus comprising:

a digital music station having means for digitizing at least one package from at least one audio recording to create at least one digitized audio recording and having means for recording identifying information related to said at least one audio recording;

said at least one audio recording further comprises a packaging and said identifying information is disposed on said packaging;

a digital music server for storing said at least one digitized audio recording passage and identifying information;

at least one listening station having means for recognizing said identifying information from said at least one audio recording, means for retrieving said at least one digitized audio recording passage related to said identifying information, and means for reproducing said at least one digitized audio recording passage based on said identifying information, said recognizing and retrieving means being activated upon presentation of said packaging to said at least one listening station; and a network for interconnecting the digital music station, the digital music server and the at least one listening station.

11. A digital music storage and reproduction apparatus in accordance with claim 3, wherein said recognizing means further comprises a scanner for scanning said packaging.

12. A digital music storage and reproduction apparatus in accordance with claim 11, wherein reproducing means further comprises an audio transmission device disposed on said at least one listening station.

13. A digital music storage and reproduction apparatus in accordance with claim 11, wherein said identifying information i s a barcode and said scanner is a barcode scanner.

14. A digital music storage and reproduction apparatus in accordance with claim 12, wherein said at least one audio recording further comprises a plurality of audio selections and wherein said reproducing means further comprises selection means for allowing a user to select a particular audio selection for transmission through said audio transmission device.

15. A digital music storage and reproduction apparatus in accordance with claim 10, further comprising a plurality of listening stations interconnected to said digital music station and said digital music server.

* * * * *